United States Patent
Zhang et al.

(10) Patent No.: US 10,169,734 B2
(45) Date of Patent: Jan. 1, 2019

(54) DYNAMIC LAYOUT FOR ORGANIZATIONAL CHARTS

(71) Applicants: Kit Yue Zhang, So. San Francisco, CA (US); David Hsia, So. San Francisco, CA (US); Dominic Philip Haine, So. San Francisco, CA (US); Scott McGhee, Palo Alto, CA (US)

(72) Inventors: Kit Yue Zhang, So. San Francisco, CA (US); David Hsia, So. San Francisco, CA (US); Dominic Philip Haine, So. San Francisco, CA (US); Scott McGhee, Palo Alto, CA (US)

(73) Assignee: SUCCESSFACTORS, INC., South San Francisco, CA (US)

( * ) Notice: Subject to any disclaimer, the term of this patent is extended or adjusted under 35 U.S.C. 154(b) by 904 days.

(21) Appl. No.: 14/491,747

(22) Filed: Sep. 19, 2014

(65) Prior Publication Data

US 2016/0054894 A1 Feb. 25, 2016

Related U.S. Application Data

(60) Provisional application No. 62/040,759, filed on Aug. 22, 2014.

(51) Int. Cl.
| | |
|---|---|
| G06F 17/00 | (2006.01) |
| G06F 17/30 | (2006.01) |
| G06Q 10/06 | (2012.01) |
| G06Q 10/10 | (2012.01) |

(52) U.S. Cl.
CPC ......... G06Q 10/067 (2013.01); G06Q 10/105 (2013.01)

(58) Field of Classification Search
CPC ................ G06F 3/04842; G06Q 10/067; G06Q 10/105; G06Q 10/06
See application file for complete search history.

(56) References Cited

U.S. PATENT DOCUMENTS

| | | | | |
|---|---|---|---|---|
| 7,437,320 | B2* | 10/2008 | Davidson | G06Q 10/06 705/7.11 |
| 9,229,622 | B2* | 1/2016 | Sakamoto | G06F 3/0481 |
| 2012/0072252 | A1* | 3/2012 | Deegan | G06Q 10/063 705/7.11 |

(Continued)

*Primary Examiner* — Cheryl Lewis
(74) *Attorney, Agent, or Firm* — Fountainhead Law Group P.C.

(57) ABSTRACT

Techniques are described for dynamically adjusting the layout of an organizational chart being presented inside a browser window. Adjusting the layout of the organization chart has certain advantages such as ensuring that the organizational chart can be displayed in the browser window with minimal scrolling. The direct reports of a manager can be presented as a matrix in the organizational chart when the manager is selected. In one example, the layout of the matrix can be a vertical vector or a two dimensional vector depending on the number of direct reports the manager has. In another example, the layout of the matrix can change depending on the space available within the browser window to display the matrix. In other examples, the organizational chart can also be scaled based on the screen resolution or screen size of the client device that is presenting the organizational chart.

20 Claims, 9 Drawing Sheets

(56) References Cited

U.S. PATENT DOCUMENTS

2013/0332891 A1* 12/2013 Schmitlin ............. G06F 3/0484
715/853
2014/0236849 A1* 8/2014 Flammer ................ G06Q 10/06
705/320
2014/0278659 A1* 9/2014 Straznitskas ..... G06Q 10/06311
705/7.17

* cited by examiner

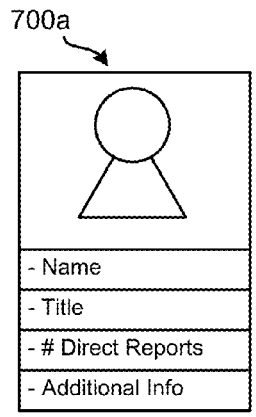
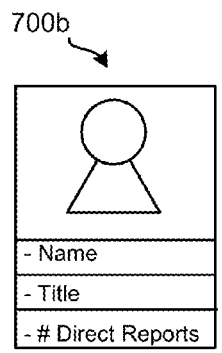
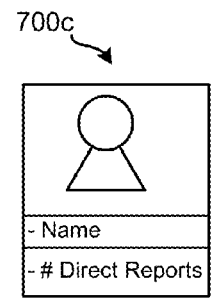
FIG. 7a     FIG. 7b     FIG. 7c
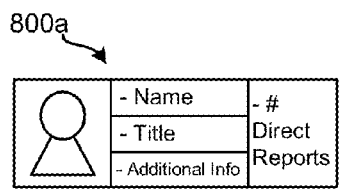
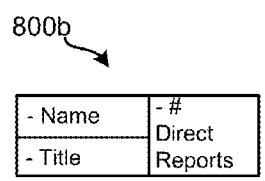
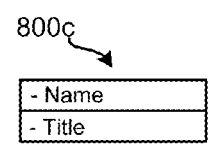
FIG. 8a     FIG. 8b     FIG. 8c

DYNAMIC LAYOUT FOR ORGANIZATIONAL CHARTS

CROSS-REFERENCE TO RELATED APPLICATION

The instant nonprovisional patent application claims priority to U.S. Provisional Patent Application Ser. No. 62/040,759, filed Aug. 22, 2014 and incorporated by reference in its entirety herein for all purposes.

BACKGROUND

An organizational chart is a diagram that graphically shows the structure of an organization and the relationships and ranks of members (or groups) within the organization. The organizational chart can be useful in helping members within the organization visualize who is in the organization and the relationships between different members. Exemplary relations include manager-employee, director to managing directors, and others. Typically, the organizational chart is presented within a window, such as a browser window.

For small business organizations, the entire organization can be presented within an organizational chart in the browser window with ease. However as organizations grow, it becomes difficult to display all the members simultaneously within the browser window. For example, a director can have multiple managers who directly report to the director. Each manager can also include many employees who directly report to the manager. Seeing the relationship between two employees can become difficult given the number of people being displayed can require scrolling around the browser window. This can be very time consuming and confusing.

SUMMARY

In one embodiment, a computer-implemented method presents, by a processor, an organizational chart within a window of a graphical user interface, the organizational chart including a plurality of nodes that each represent an employee within an organization as a tile within the window. The method then detects, by the processor, a first user input on the graphical user interface that is representative of selecting a first node from the plurality of nodes. The method then identifies, by the processor, a first set of employees within the organization that are associated with the first node. The method then determines, by the processor, a matrix layout capable of accommodating the first set of employees. The method then generates, by the processor, a first matrix in the organizational chart to represent the first set of employees, wherein the first matrix includes a plurality of tiles positioned according to the matrix layout, the plurality of tiles each being configured to represent an employee within the first set of employees. The method then visually connects, by the processor, the first matrix to the first node.

In one example, the matrix layout is a vertical vector when the first set of employees is less than a predefined threshold of employees and is a multidimensional vector when the first set of employees is equal to or more than the predefined threshold of employees. Determining the matrix layout can include determining, by the processor, a number of employees within the first set of employees, selecting, by the processor, dimensions for the multidimensional vector based on the number of employees to reduce the occurrence of an empty tile in the matrix.

In another example, determining the matrix layout can include identifying, by the processor, a plurality of potential matrix layouts based on a number of employees in the second set of employees and selecting, by the processor, the first matrix layout from the potential matrix layouts based on available space within the window.

In another example, the method can further include detecting, by the processor, a second user input on the graphical user interface that is representative of resizing the window, determining, by the processor, that the matrix overlaps with a boundary of the resized window, and updating, by the processor, the matrix layout of the first matrix to fit the first matrix within the resized window.

In another example, the method can further include determining, by the processor, that the first matrix and a second matrix violate a predefined spacing requirement, the second matrix being configured to represent a second set of employees and being visually connected to a second node from the plurality of nodes, horizontally shifting, by the processor, the first matrix and the second matrix until the first matrix and the second matrix satisfy the predefined spacing requirement, and horizontally shifting, by the processor, the plurality of nodes according to the horizontal shifting of the first matrix and the second matrix.

In another example, the method can further include determining, by the processor, that the organizational chart extends outside the window and resizing, by the processor, the tiles that represent each of the plurality of nodes and the plurality of tiles that represent the first set of employees such that the organizational chart fits within the window. Resizing can include determining, by the processor, a scaling rate to adjust the size of the organizational chart, selecting, by the processor, a tile template based on the scaling rate wherein the tile template specifies the content presented in the plurality of tiles, and applying, by the processor, the selected tile template to the plurality of tiles.

In another embodiment, a non-transitory computer readable storage medium stores one or more programs comprising instructions for presenting an organizational chart within a window of a graphical user interface, the organizational chart including a plurality of nodes that each represent an employee within an organization as a tile within the window, detecting a first user input on the graphical user interface that is representative of selecting a first node from the plurality of nodes, identifying a first set of employees within the organization that are associated with the first node, determining a matrix layout capable of accommodating the first set of employees, generating a first matrix in the organizational chart to represent the first set of employees, wherein the first matrix includes a plurality of tiles positioned according to the matrix layout, the plurality of tiles each being configured to represent an employee within the first set of employees, and visually connecting the first matrix to the first node.

In another embodiment, a computer implemented system comprises one or more computer processors and a non-transitory computer-readable storage medium. The non-transitory computer-readable storage medium comprises instructions, that when executed, control the one or more computer processors to be configured for presenting an organizational chart within a window of a graphical user interface, the organizational chart including a plurality of nodes that each represent an employee within an organization as a tile within the window, detecting a first user input on the graphical user interface that is representative of selecting a first node from the plurality of nodes, identifying a first set of employees within the organization that are associated with the first node, determining a matrix layout capable of accommodating the first set of employees, generating a first matrix in the organizational chart to represent the first set of employees, wherein the first matrix includes a plurality of tiles positioned according to the matrix layout, the plurality of tiles each being configured to represent an employee within the first set of employees, and visually connecting the first matrix to the first node.

The following detailed description and accompanying drawings provide a better understanding of the nature and advantages of the present disclosure.

BRIEF DESCRIPTION OF THE DRAWINGS

FIGS. 7a, 7b, and 7c illustrate exemplary tile templates according to one embodiment;

FIGS. 8a, 8b, and 8c illustrate exemplary tile templates according to one embodiment;

DETAILED DESCRIPTION

Figure 1:
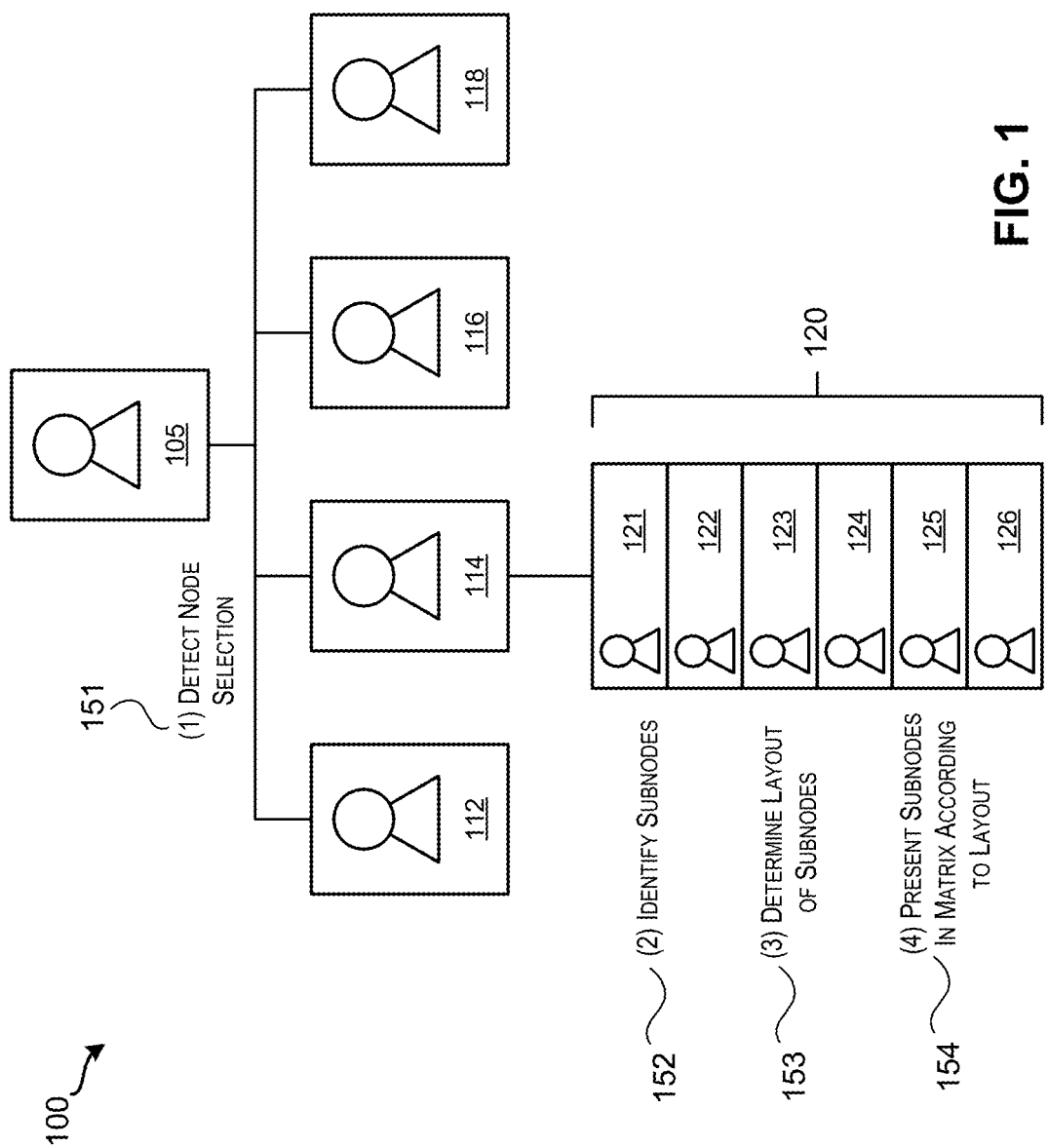
FIG. 1 illustrates a workflow for presenting a first selected node in an organizational chart according to one embodiment.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Described herein are techniques for dynamically updating the layout of an organizational chart to better utilize the viewable area within window. The window can be a browser window. An organization is typically organized hierarchically, where the highest ranking people are at the apex and the lowest ranking people are at the bottom, thus appearing like a pyramid. The base of the pyramid are members of the organization that do not have any subordinates. In some embodiments, one level of the hierarchy is initially displayed in the browser window. For example, a person of interest can be presented on the apex and the direct reports of the person of interest are presented in a horizontal row below the person of interest. Employees presented in the same row typically appear in the same level of the hierarchical organization. Selecting a direct report can cause the system to present the direct reports of the selected direct report in the organizational chart.

In one embodiment, the system can dynamically alter the layout in which the direct reports are presented according to the number of direct reports that need to be presented. For example, a vertical vector can be used to present the direct reports when the number of direct reports is under a predefined threshold. This can reduce horizontal scrolling to view all the direct reports, thereby improving the visibility of the organizational chart. Alternatively, a two-dimensional matrix can be used to present the direct reports when the number of direct reports is equal to or over the predefined threshold. Viewing a large numbers of direct reports may be easier in a two-dimensional matrix rather than a one-dimensional matrix (e.g., vertical vector) since it reduces vertical scrolling. In other embodiments, the system can dynamically alter the layout based on the number of direct reports to present and the available space in the browser window. For example, the dimensions of the matrix can be selected to maximize the number of direct reports that can be simultaneously presented in the viewable area of the browser window along with the person of interest that is managing the direct reports. In yet other embodiments, selecting multiple nodes in the organizational chart or resizing the browser window can result in the layout of the organizational chart to be dynamically altered.

The system can be implemented on the client side or server side. For example, the system can be implemented on the client device and be configured to update the organizational chart according to user input received on the client device. As another example, the system can be implemented on a server that is in communication with a client device. User input received on the client device can be transmitted from the client device to the server. The server can process the detected user input and update the organizational chart. Once updated, the server can transmit the updated organizational chart or the necessary changes to update the existing organizational to the client device. The client device can present the content received to the user.

FIG. 1 illustrates a workflow for presenting a first selected node in an organizational chart according to one embodiment. Organizational chart 100 is being presented in a window of a graphical user interface. Organizational chart 100 can be generated based on an underlying hierarchical organization. The hierarchical organization is a structure that describes people (or other entities) within the organization as a subordinate or manager. Each person can be represented as a node within the hierarchical organization. Nodes can connect with one another to represent relationships between people. For example, a node representing a manager can be directly connected to a subnode representing a direct report. The placement of the subnode representing the direct report can appear below the node representing the manager. Organizational chart 100 is a visual representation of a view of the hierarchical organization. The view can present a portion of the hierarchical organization with respect to a person of interest. One or more nodes of the hierarchical organization can be presented in the organizational chart. As shown, this view is based on the relationships with a manager in the hierarchical organization that is being represented by node 105. For this reason, node 105 appears at the apex of organizational chart 100. Under node 105, organizational chart 100 includes nodes 112, 114, 116, and 118. These nodes represent the direct reports of the manager. Since nodes 112, 114, 116, and 118 have the same ranking with respect to the manager being represented by node 105, these nodes are appear along the same horizontal plane below node 105. In some embodiments, a node can be visually presented in organizational chart 100 as a tile. The tile can include attributes corresponding to the person that is being represented by the node. For example, the tile can include the person's profile image, name, role/title in the organization, number of direct reports, number of total reports, and other attributes that are related to the person.

The workflow begins at step (1) (reference numeral 151) with the system detecting user input on the graphical user interface that is representative of selecting node 114. Node 114 represents an employee and selection of node 114 can be interpreted as an interest to display the direct reports of the employee. Once node 114 has been selected, the workflow continues by identifying the subnodes (e.g., direct reports) of node 114 at step (2) (reference numeral 152). This can be completed by querying the hierarchical organization for the direct reports of node 114. This can be the subnodes that are directly connected to node 114. Once the subnodes have been identified, the workflow can continue by determining a layout to apply to the subnodes at step (3) (reference numeral 153). The layout can be selected from one or more predefined layouts that are applicable to the subnodes. The applicability of a predefined layout to the subnodes can be determined by the number of subnodes that exist. For example, there may be three applicable layouts (4×1, 2×2, and 1×4) that are applicable when there are four subnodes available. Here, the workflow can determine that the layout to apply to the subnodes is a vertical vector since the number of subnodes is below a predefined threshold. Once the layout has been determined, the workflow can continue by presenting the subnodes in a matrix according to the layout at step (4) (reference numeral 154). Here, the layout for matrix 120 is a vertical vector and as a result, subnodes 121-126 are presented in matrix 120 as a vertical vector. Matrix 120 can disappear from organizational chart 100 when user input representative of selecting node 114 a second time is detected. Selecting a node a first time can cause the subnodes of the selected node to appear in organizational chart 100 while selecting the node a second time can cause the subnodes of the selected node to disappear from organizational chart 100. In some embodiments, a look up table can be used in determining the layout for matrix 120. For example, a look up table can specify the dimensions of the matrix according to the number of subnodes of node 114. Each entry in the look up table can specify the dimensions for matrix 120 (e.g., number of rows and columns).

In some embodiments, more than one node (or subnode) can be selected in the organizational chart. The ability to select multiple nodes (or subnodes) in the organizational chart provides freedom to a user when exploring the hierarchical organization. For example, the direct reports of a first manager can be viewed simultaneously with the direct reports of a second manager. This allows the subordinates of different managers to be compared with one another. As another example, the direct reports of an upper level manager can be viewed simultaneously with the direct reports of a lower level manager where the lower level manager reports to the upper level manager. As a result, multiple levels of hierarchy can be explored at the same time.

Figure 2:
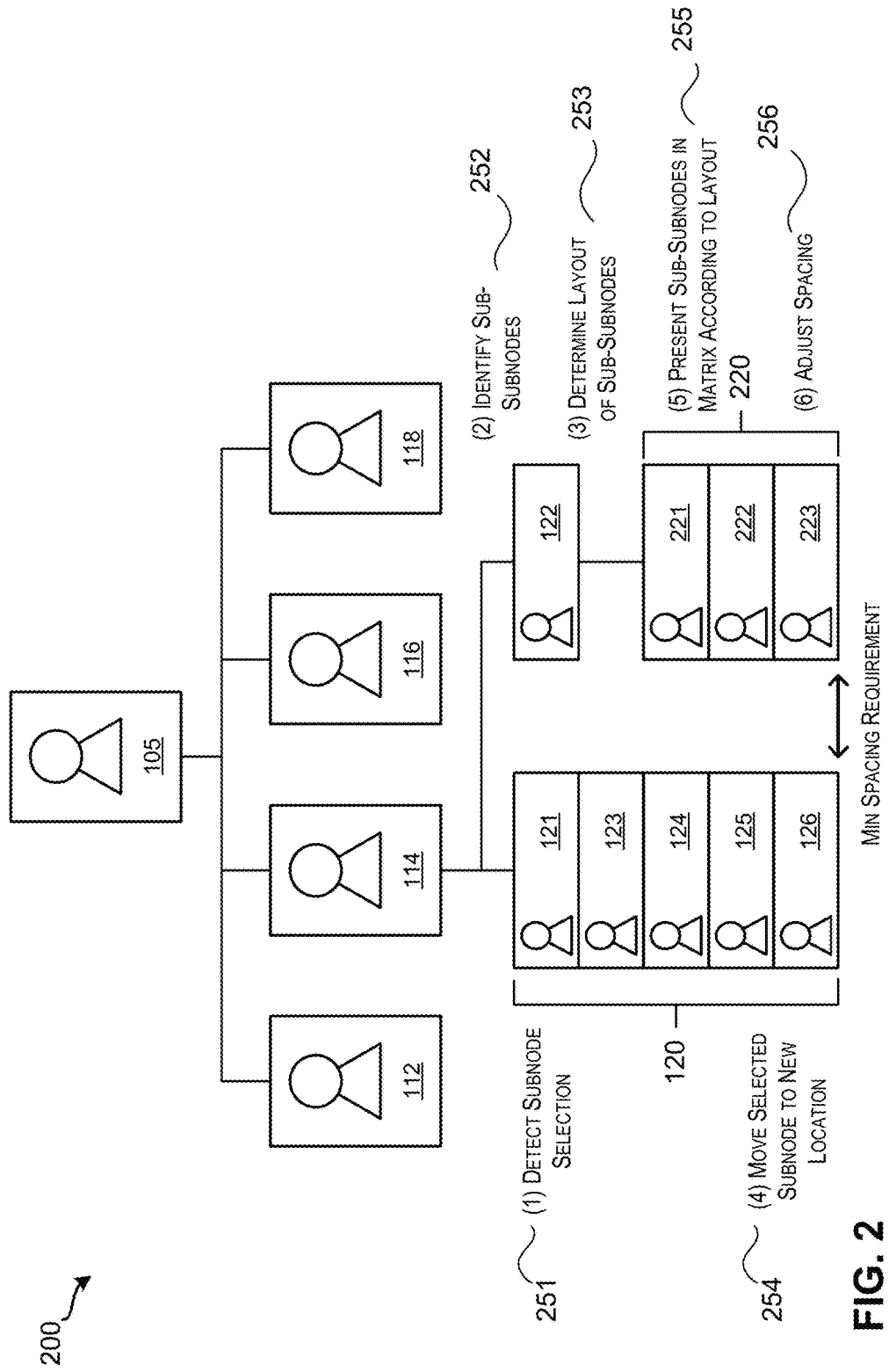
FIG. 2 illustrates a workflow for presenting a second selected node in an organizational chart according to one embodiment.

FIG. 2 illustrates a workflow for presenting a second selected node in an organizational chart according to one embodiment. Organizational chart 200 can be presented in response to the selection of subnode 122 in organizational chart 100 of FIG. 1. The workflow can begin by detecting user input representative of selecting subnode 122 at step (1) (reference numeral 251). When the selection of subnode 122 is detected, workflow 200 can continue by identifying the sub-subnodes of subnode 122 at step (2) (reference numeral 252). The sub-subnodes represent the direct reports of the employee represented by subnode 122. Identifying the sub-subnodes can include querying the hierarchical organization for the direct reports of subnode 122. Once the sub-subnodes have been identified, the workflow can continue by determining a layout for the sub-subnodes at step (3) (reference numeral 253). In one embodiment, the layout of the sub-subnodes can be determined based on the number of sub-subnodes that exist for subnode 122. For example if the number of sub-subnodes is below a predefined threshold (e.g., 15), then the layout can be a vertical vector. Alternatively if the number of sub-subnodes is above or equal to the predefined threshold, then the layout can be a multi-dimensional matrix. Here, the layout would be a vertical vector since there are three sub-subnodes, which is under the predefined threshold of 15.

Once the layout has been determined, the workflow can proceed by moving the selected subnode (subnode 122) from matrix 120 to a new location in organizational chart 200 at step (4) (reference numeral 254). In one embodiment, the new location can be in the same horizontal plane as matrix 120 to signify that subnode 122 and the subnodes within matrix 120 reside in the same hierarchical level within the hierarchical organization. The new location can be to the left or the right of matrix 120. In one example, the workflow can move subnode 122 to the side of matrix 120 that has more room in organizational chart 200. In another example, the workflow can move subnode 122 to the side of matrix 120 that is more centered in organizational chart 200.

Once subnode 122 has been moved to its new location, the workflow continues by presenting sub-subnodes in matrix 220 according to the determined layout at step (5) (reference numeral 255). Here, sub-subnodes 221, 222, and 223 are presented within matrix 220 in a vertical vector format. Once matrix 220 has been presented, the workflow can optionally adjust the spacing between nodes, subnodes, and sub-subnodes to ensure that minimum spacing requirements are satisfied at step (6) (reference numeral 256). Minimum spacing requirements can specify the amount of space that should exist between elements (nodes, subnodes, matrixes, etc.) within organizational chart 200. For example if the spacing between matrix 120 and matrix 220 violates the minimum spacing requirements, matrix 220 can be moved away from matrix 120 until the minimum spacing requirement is satisfied. This movement can also cause connected nodes (subnodes, etc.) of matrix 220 to also move. For example subnode 122 can also move in the same direction by the same distance as matrix 220 to satisfy the minimum spacing requirement. In some examples, the movement of one element can cause a chain reaction of violations of other spacing requirements. Thus, the workflow can recursively adjust the spacing between elements of organizational chart 200 until all minimum spacing requirements are satisfied. In some embodiments, the minimum spacing requirements can depend on the zoom level of organizational chart 200. For example, the minimum spacing requirement between two matrixes can be 50 pixels at zoom level 100% and can be 25 pixels at zoom level 50%. In other words, the minimum spacing requirements can be dynamically adjusted when the zoom level changes to maintain a similar layout as the user zooms in and out of organizational chart 200.

Figure 3:
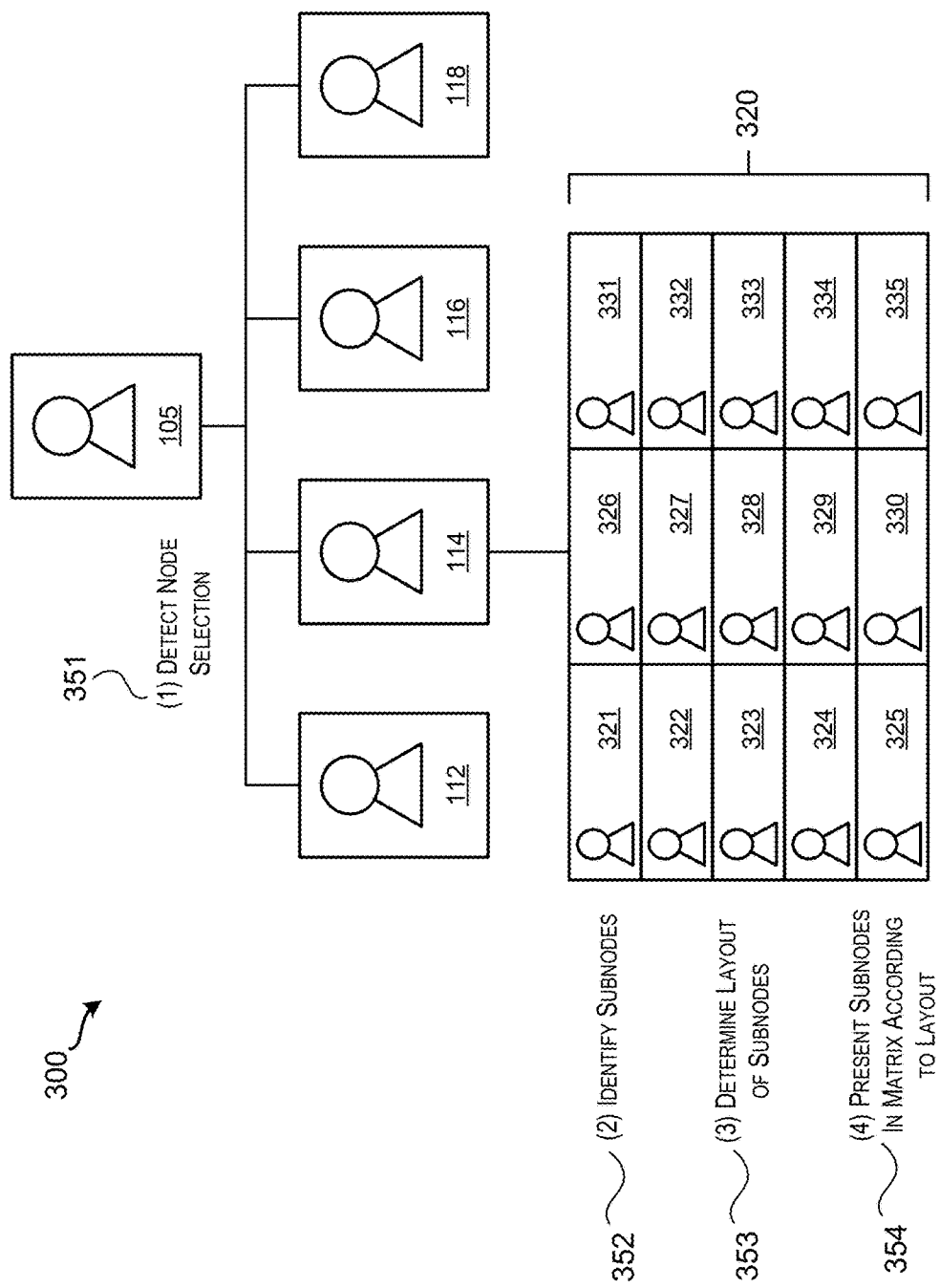
FIG. 3 illustrates another workflow for presenting a selected node in an organizational chart according to one embodiment.

FIG. 3 illustrates another workflow for presenting a selected node in an organizational chart according to one embodiment. Similar to organizational chart 100 of FIG. 1, organizational chart 300 includes node 105 and the direct reports of node 105, which are nodes 112, 114, 116, and 118.

The workflow begins at step (1) (reference numeral 351) with the system detecting user input on the graphical user interface that is representative of selecting node 114. Node 114 represents an employee and selection of node 114 can be interpreted as an interest to display the direct reports of the employee. Once node 114 has been selected, the workflow reports of node 114. This can be the subnodes that are directly connected to node 114. Once continues by identifying the subnodes (e.g., direct reports) of node 114 at step (2) (reference numeral 352). This can be completed by querying the hierarchical organization for the direct the subnodes have been identified, the workflow can continue by determining a layout to apply to the subnodes at step (3) (reference numeral 353). The layout can be selected from one or more predefined layouts that are applicable to the subnodes. The applicability of a predefined layout to the subnodes can be determined by the number of subnodes that exist. In one embodiment, the workflow can attempt to avoid the presence of an empty element in matrix 320 by selecting a layout that fits the subnodes. For example if there are 15 subnodes, then the layouts which may be applicable are 15×1, 3×5, 5×3, and 1×15. Layouts containing 8×2 or 2×8 may not be preferred since populating 15 subnodes into a 8×2 matrix would result in an empty element in the matrix. Here, the workflow can determine that the layout to apply to the subnodes is a two dimensional matrix since the number of subnodes is equal to or above a predefined threshold (threshold is 15). Of the two dimensional matrixes, a 5×3 and 3×5 may be recommended and one of the two can be selected. In one example, the preferred layout can have more rows than columns (e.g., 5×3) since it would reduce horizontal scrolling in organizational chart 300.

Once the layout has been determined, the workflow can continue by presenting the subnodes in a matrix according to the layout at step (4) (reference numeral 354). Here, the layout for matrix 320 is a 5×3 matrix. The subnodes of node 114 (e.g., subnodes 321-335) are presented in matrix 320 according to the layout. Each subnode can be presented as a tile where attributes of the employee corresponding to the subnode can be displayed in the tile. In some embodiments, the tiles used to present the subnodes in a matrix can be different than the tiles used to present nodes in the organizational chart 300. For example, the tiles used to represent nodes in the organizational chart can be larger in size. As a result, the type font can be larger in size or additional information can be presented in the tiles that represent the nodes. Matrix 320 can disappear from organizational chart 100 when user input representative of selecting node 114 a second time is detected. Selecting a node a first time can cause the subnodes of the selected node to appear in organizational chart 300 while selecting the node a second time can cause the subnodes of the selected node to disappear from organizational chart 300.

Figure 4:
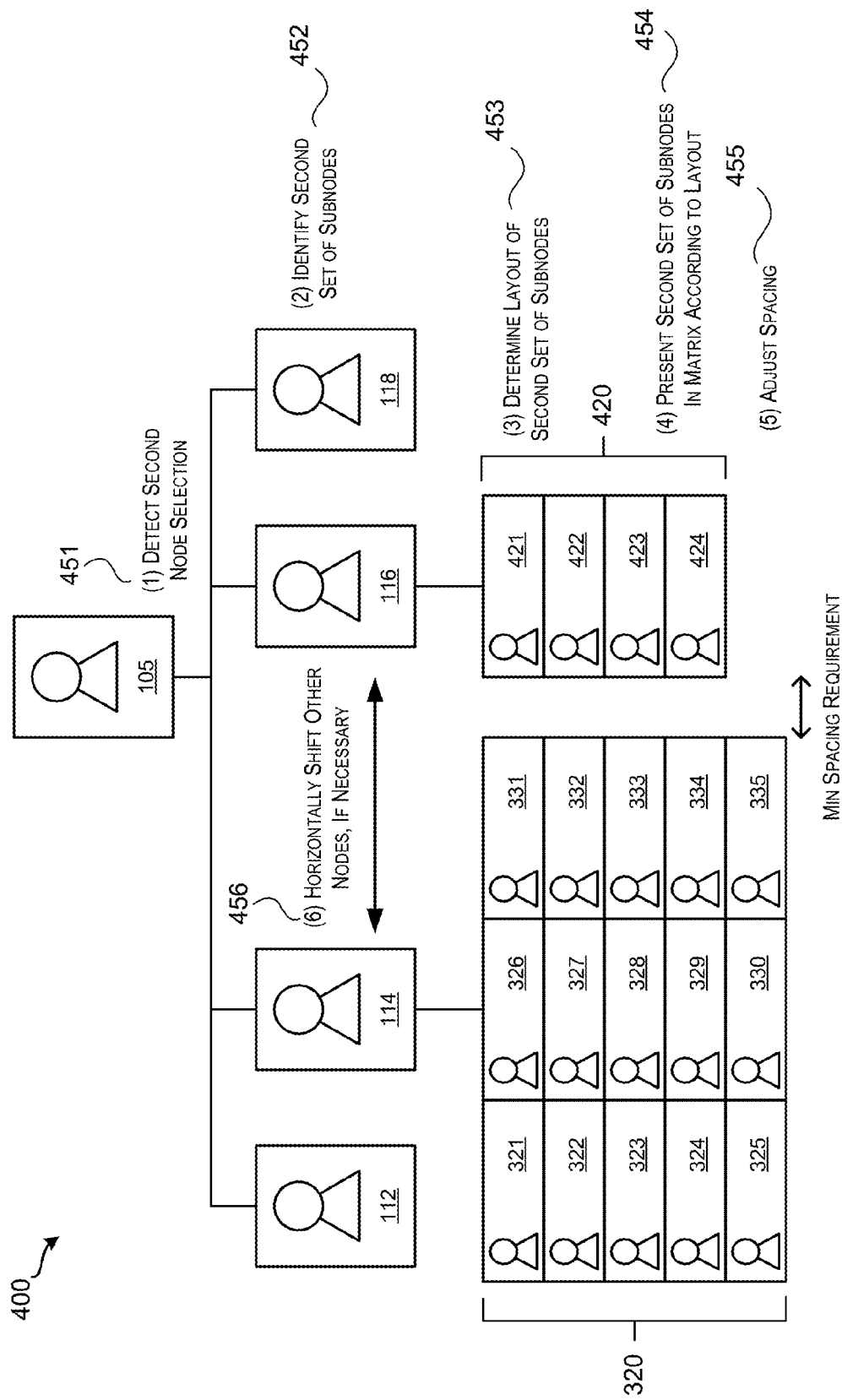
FIG. 4 another illustrates a workflow for presenting a second selected node in an organizational chart according to one embodiment.

FIG. 4 another illustrates a workflow for presenting a second selected node in an organizational chart according to one embodiment. Organizational chart 400 can be presented in response to the selection of node 116 in organizational chart 300 of FIG. 3. As shown here, the second node detected resides in the same horizontal layer as an earlier selected node (node 114). Here, the workflow begins by detecting a second node being selected at step (1) (reference numeral 451). Selection of the second node can be understood as an interest to present the direct reports of the second node in organizational chart 400. Once the second node has been selected, the workflow continues by identifying a second set of subnodes at step (2) (reference numeral 452). The subnodes can represent the direct reports of the employee that corresponds with node 116. Here, subnodes 421-424 represent the direct reports of node 116. After the second set of subnodes are identified, the workflow continues by determining the layout for the second set of subnodes at step (3) (reference numeral 453). The layout for the second set of subnodes can be determined using the same approach as determining the layout for the first set of subnodes (the subnodes of matrix 320). Here, the layout for the second set of subnodes is a vertical vector when the number of subnodes is below a predefined threshold of 15. Alternatively if the number of subnodes is greater than or equal to the predefined threshold of 15, a two dimensional matrix is used as the layout.

Once the layout has been determined, the workflow continues by presenting the second set of subnodes in a matrix according to the layout. Here, the matrix is based on the layout of a vertical vector and as a result, subnodes 421-424 are presented in matrix 420 as a vertical vector. In some embodiments, the workflow can adjust for minimum spacing requirements at step (5) (reference numeral 455). While adjusting for the minimum spacing requirement, the workflow may horizontally shift other nodes (particularly parent nodes of the second set of subnodes) so that the parent nodes of the subnodes appear above the matrix at step (6) (reference numeral 456). In one embodiment, the workflow can check for and adjust the spacing within the organizational chart to ensure that the minimum spacing requirements are satisfied before presenting matrix 420. In another embodiment, the workflow can initially present matrix 420 in organizational chart 400 and then incrementally move the nodes, subnodes, and matrixes in organizational chart 400 until the minimum spacing requirements are satisfied. The movement can be animated. For example, the workflow can present matrix 320 slowly shifting horizontally away from matrix 420 until the minimum spacing requirement is satisfied. While matrix 320 is shifting, node 114 can also shift along with matrix 320. Shifting node 114 can also cause node 112 to shift along with node 114 to ensure that the minimum spacing requirement between node 112 and 114 is not violated.

Figure 5:
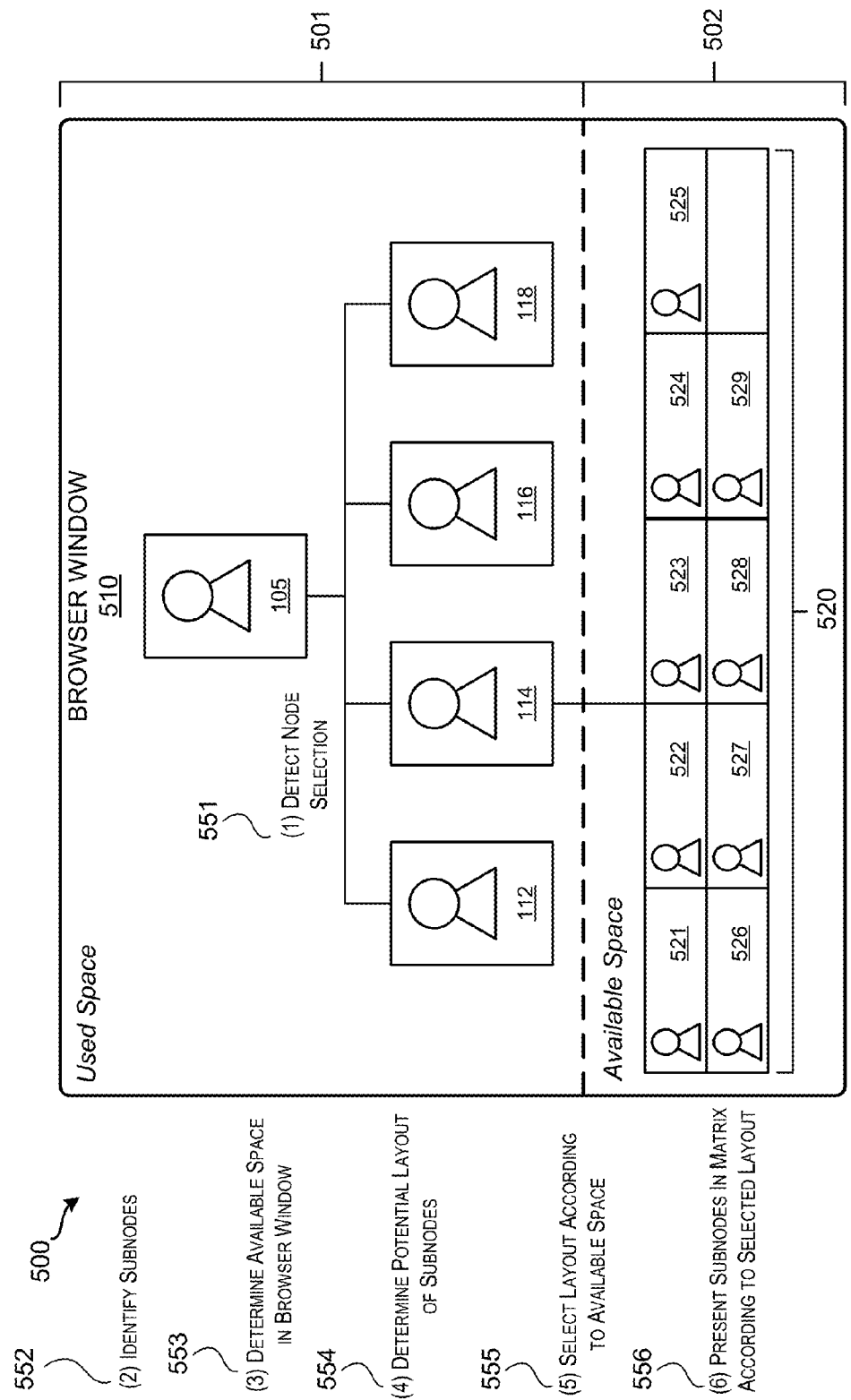
FIG. 5 illustrates another workflow for presenting a selected node in an organizational chart according to one embodiment.

As described above, the system can adjust the layout of the matrix based on the number of subnodes that are to be presented. In some embodiments, the system can alternatively adjust the layout of the matrix to be presented in the organizational chart based on the space available in the browser window. FIG. 5 illustrates another workflow for presenting a selected node in an organizational chart according to one embodiment. As shown here, organizational chart 500 is presented within browser window 510. Organizational chart 500 includes nodes 105, 112, 114, 116, and 118. These nodes occupy portion 501 of browser window 510, also known as the used space of browser window 510. Browser window 510 also includes portion 502 which is the available space of browser window 510. The available space is the parts of browser window 510 that are available for the presentation of a matrix. The system can dynamically adjust the layout of a matrix based on the available space. In some examples, the available space can specify an area of browser window 510, as measured in pixels.

Here, the workflow can begin by detecting user input representative of selecting node 114 of organizational chart 500 at step (1) (reference numeral 551). The workflow can then continue by identifying the subnodes of the selected node at step (2) (reference numeral 552). The subnodes can be identified by querying a hierarchical organization for the direct reports of the employee being represented by node 114. Once the subnodes have been identified, the workflow can continue by determining the available space in browser window 510 at step (3) (reference numeral 553). The available space is the portion of the usable space in browser window 510 that is available to the system to add to organizational chart 500. In some examples where browser window 510 allows for scrolling, the usable space within browser window 510 can extend past the viewable space of browser 510. For instance, the usable space in browser window 510 can be 120% of the viewable space in browser window if browser window 510 is configured to allow for 20% scrolling.

The available space in browser window 510 can be calculated using various methods. In one embodiment, the system can determine the available space by identifying the portion of the usable space in browser window 510 that resides below the selected node (node 114). Here, browser window 510 does not allow for scrolling so portion 502 represents the area of browser window 510 that resides below selected node 114. If subnodes or matrixes of organizational chart 500 already exist in portion 502, then the available space would be the part of portion 502 that is currently not being utilized by organizational chart 500. In another embodiment, the system can determine the available space by first calculating the used space within browser window 510. Calculation of the used space can be performed by measuring the portion of browser window 510 that is currently be utilized to present organizational chart 500 when node 114 is selected. Here, portion 501 has been measured as the part of browser window 510 that is being utilized to present organizational chart 500 when the selection of node 114 is detected. The system can subtract portion 501 from the usable space of browser window 510 to determine the available space. As shown here, the available space is portion 502. In some examples, the available space and the used space can take into consideration in screen resolution. Thus, calculation of the used space and the available space can be measured in pixels. By knowing how the dimensions of the available space in pixels, the system can determine the number and orientation of tiles that can fit within the available space. This is by knowing the default size of each tile that is used to represent a subnode.

Once the available space has been determined, the workflow continues by determining the potential layout for the subnodes at step (4) (reference numeral 554). The potential layout can depend on the number of subnodes to present. For example, the system can determine that there are multiple layouts to present the nine subnodes. The potential layouts can include a 2×5 matrix, a 5×2 matrix, and a 3×3 matrix. In one embodiment, the system may provide potential layouts which minimize the occurrence of empty elements in the layout. Here, the 2×5 matrix can store 10 elements. Given that there are only nine subnodes, one element in the matrix will remain empty. Similarly, the 5×2 matrix will have one empty element. The 3×3 element will have zero empty elements. A 4×3 matrix can be determined to not be a potential layout since the layout would result in two empty elements. In some examples, a variable on the system can be configured to specify the maximum number of empty elements in the layout.

At step (5) (reference numeral 555), the workflow can select a layout from the potential layouts according to the available space. In one embodiment, a potential layout without empty elements can be preferred. Here, the system may determine that while a 3×3 layout is preferred when there are nine subnodes, three rows cannot fit within the available space. This determination can be made based on the dimensions of a tile used to represent a subnode and the dimensions of the available space. As a result, other layouts are considered. The system can determine that the available space allows for at most a matrix containing two rows. As a result, the system can select a 2×5 layout based on the available space in browser window 510 over a 5×2 layout or a 3×3 layout. Once the layout has been selected, the workflow continues by presenting the subnodes in matrix 520 according to the selected layout at step (6) (reference numeral 556). As shown here, subnodes 521-529 are being presented in matrix 520 in a multi-dimensional matrix where the layout of the matrix is determined based on the available space.

Figure 6:
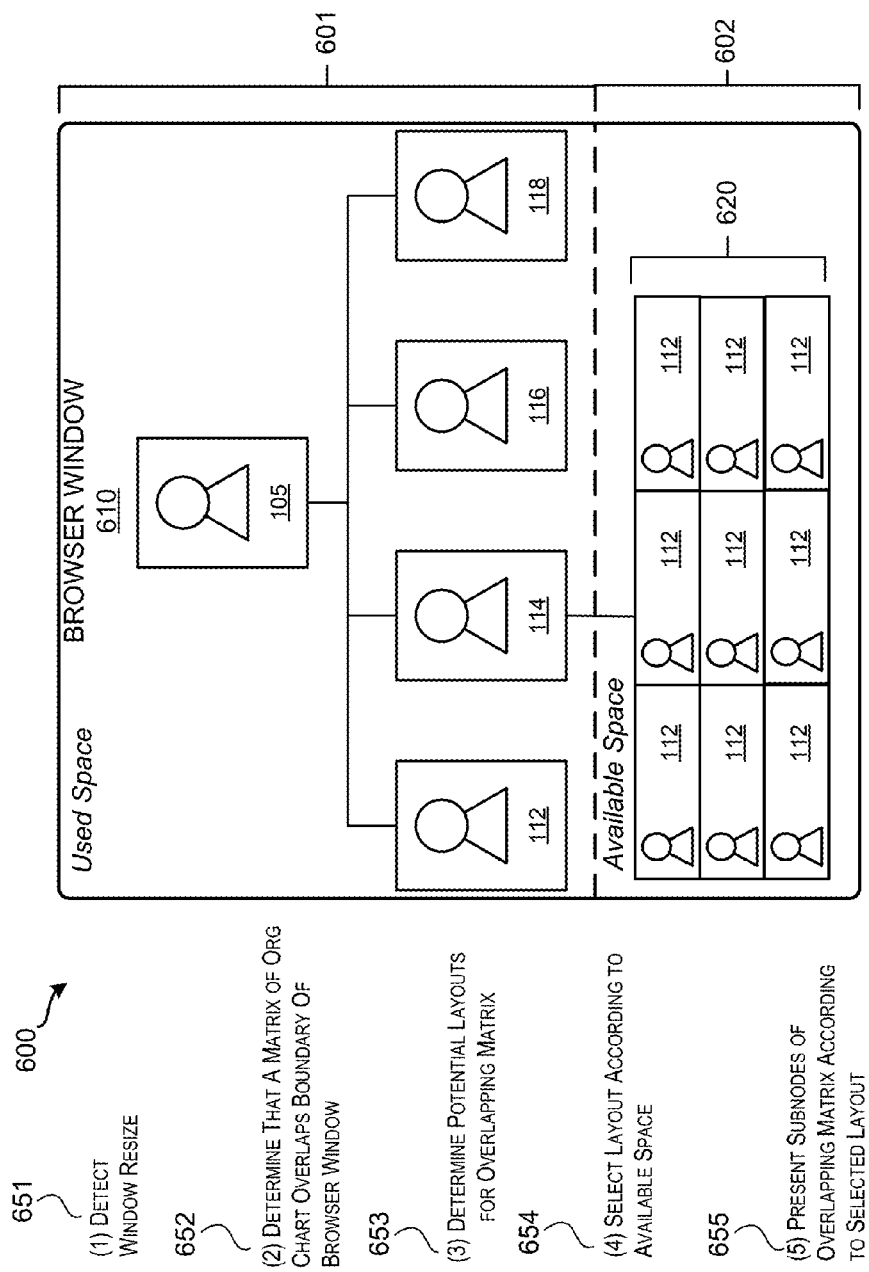
FIG. 6 illustrates a workflow for altering an organizational chart in response to a window resize according to one embodiment.

In some instances, user input can be received to resize the browser window. Resizing the browser window can alter the dimensions of the browser window. As a result, the organizational chart which use to fit within the useable space of the browser window may no longer fit. In these scenarios, the system may adjust the organizational chart to fit within the browser window. FIG. 6 illustrates a workflow for altering an organizational chart in response to a window resize according to one embodiment. Organizational chart 600 includes node 105, 112, 114, 116, and 118. In its initial state, organizational chart 600 can appear similar or substantially similar to organizational chart 500 of FIG. 5. Node 114 can be connected to matrix 520 which contains subnodes. Organizational chart 500 can transition to organizational chart 600 in response to a resize of the browser window from browser window 510 to browser window 610.

At step (1) (reference numeral 651), the workflow can detect user input representative of resizing browser window 610. In one example, the user input can be a click and drag gesture performed by a mouse or other peripheral device. In another example, the user input can be a touch gesture performed on a touch screen display. Once the window resize has been detected, the workflow can continue by determining that a matrix (or other element) of organizational chart 500 overlaps the boundary of usable area of resized browser window 610 at step (2) (reference numeral 652). During resizing, the usable area of browser window 610 can change dimensions. As a result, elements of organizational chart 500 which previously resided within the usable area of browser window 610 now reside wholly or partially outside the usable area of browser window 610. These elements of organizational chart 500 are known as overlapping elements of organizational chart 500. In this example, matrix 520 is an overlapping element since it is partially outside the usable area of browser window 610.

At step (3) (reference numeral 653), the workflow determines the potential layouts that are available for the overlapping matrix. For example, matrix 520 is a 2×5 matrix but other potential matrixes are a 5×2 matrix and a 3×3 matrix. Once the other potentially matrixes have been identified, the workflow continues by select a layout according to the available space in resized browser window 610 at step (4) reference numeral. Here, the available space is portion 602 of browser window 610. Out of the potential layouts (e.g., 2×5, 5×2, and 3×3), the system determines that layout 3×3 would allow the overlapping matrix to fit within the available area of resized browser window 610. As a result, the workflow presents the subnodes of matrix 520 in a 3×3 table, thus resulting in matrix 620. As shown here, matrix 620 now fits within the available space of browser window 610. In some examples, modifying a matrix may cause the modified matrix to collide with other elements in organizational chart 600. As a result, organizational chart 600 can iteratively be modified until all elements of organizational chart 600 fit within browser window 610.

In some instances, the available space within browser window 510 may be insufficient to present any of the potential layouts of matrix 620. This can be due to the fact that there are too many subnodes to present in the available space. Alternatively, this can be due to the fact that the resized browser window is leaves not enough available space to present matrix 620. In one embodiment, the system can recognize this condition and automatically close matrix 620, thus making it appear as though node 144 has not been selected. In another embodiment, the system can recognize this condition and automatically scale organizational chart 600 such that organizational chart 600 fits within browser window 610. Resizing organizational chart 600 can cause the tiles of organizational chart 600 to shrink in size and thus occupy fewer pixels. The smaller sized tiles can present fewer attributes than the larger tiles.

FIGS. 7a, 7b, and 7c illustrate exemplary tile templates according to one embodiment. Each tile template is associated with a different sized tile which can be used to represent a node or subnode in the organizational chart. The system may select a tile template based on the scale of the organizational chart. Tile templates for larger tiles can present more information than tile templates for smaller tiles. As described above, the system may scale down the organizational chart so that it fits within the useable area of the browser window.

FIG. 7a illustrates a large tile template according to one embodiment. Tile template 700a is configured to present various attributes of the node (or subnode). Tile template 700a includes a profile picture associated with the node, the name of the employee associated with the node, the title of the employee associated with the node, the number of employees who directly report to the employee associated with the node, and/or additional information on the employee associated with the node. More or fewer attributes can be presented in tile template 700a. In one embodiment, the additional information presented can be role based. Thus, the information being presented in tile template 700a can depend on the party generating the organizational chart. For example if the organizational chart is being generated for a manager, the additional information for each node can include the salaries of the employees who directly report to the manager. In contrast if the organizational chart is being generated for a low level employee, the salaries of the employee's colleagues may not be presented as additional information. In another embodiment, the additional information presented can be context based. In other words, the additional information presented can depend on the node (or subnode) which the tile represents. For example, the system may not present an attribute on the number of direct reports for a tile that represents a low level employee without direct reports. As another example, the system may not present an attribute on the amount of time off which the employee has accrued if the employee being represented by the tile is not a full time employee. Thus, one or more attributes of the node (or subnode) can affect the context of the tile and thus affect what attributes will be presented in the tile. In some embodiments, one or more of the attributes presented can be selectable. Selecting the attribute can be interested by the system as input representative of a request to present the direct reports of the tile in the organizational chart. For example, the number of direct reports attribute can be selectable (i.e., actionable) where selecting the number of direct reports attribute is processed by the system as a request to present the direct reports of the tile in the organizational chart. To remove the direct reports from the organizational chart, the attribute can be selected a second time. For example selecting the number of direct reports attribute can cause the direct reports to be removed from the organizational chart.

FIG. 7b illustrates a medium tile template according to one embodiment. When the organizational chart is scaled down past a predefined threshold, the system may utilize tile template 700b instead of tile template 700a when presenting the organizational chart. By using a smaller tile template, the overall size of the organizational chart will be smaller. As shown here, tile template 700b includes a profile picture, a name, a title, and a number of direct reports. As described above, one or more of the attributes presented can be actionable where selecting the attribute can result in an expansion of the organizational chart to display the direct reports of the employee being represented by the tile.

FIG. 7c illustrates a small tile template according to one embodiment. As shown here, tile template 700c includes even fewer attributes than template 700b and thus is even smaller in size. When the scaling factor of the organizational chart falls below another threshold, then tile template 700c can be utilized in generating the organizational chart. In some embodiments, the minimum tile template size that can be applied to an organizational chart can depend on the screen resolution and the size of the screen on the client device that is presenting the organizational chart. For example, it may be undesirable to apply the small tile template on a small screen with high resolution since the actual size of the tiles may be too small for a user to read. The system can implement a conditional check which determines the actual pixel size based on the screen resolution and the size of the screen. The pixel size can then be combined with the size of the tile to calculate the actual size of the tile. If the actual size of the tile is smaller than a predefined threshold, then the system may determine that the tile template is too small for presentation on the client's device and automatically move up to a larger tile template that satisfies the predefined threshold.

FIGS. 8a, 8b, and 8c illustrate exemplary tile templates according to one embodiment. These tile templates can be applied to present tiles in matrixes of the organizational chart. As shown, tile templates for tiles in a matrix can be smaller than the tile templates for tiles not part of a matrix (e.g., tile templates 700a, 700b, and 700c). FIG. 8a illustrates a large tile template according to one embodiment. Tile template 800a includes a profile picture, name, title, number of direct reports, and additional information. FIG. 8b illustrates a medium tile template according to one embodiment. Tile template 800b includes a name, title, and number of direct reports. FIG. 8c illustrates a small tile template according to one embodiment. Tile template 800c includes a name and title. As described above, one or more of these attributes can be actionable. Furthermore, the attributes presented in a given tile template can be context-based or role-based. In some embodiments, the system dynamically adjust the layout of the organizational chart when the organizational chart does not fit within the browser window by using a two-step process. In the first step, the system can adjust the layout and spacing of different tiles in the organizational chart to try and fit the organizational chart within the usable area of a browser window. If adjusting the layout and spacing does not resolve the issue, the system can further adjust the scaling of the organizational chart. The system can go repeat these steps until the organizational chart fits within the browser window.

Figure 9:
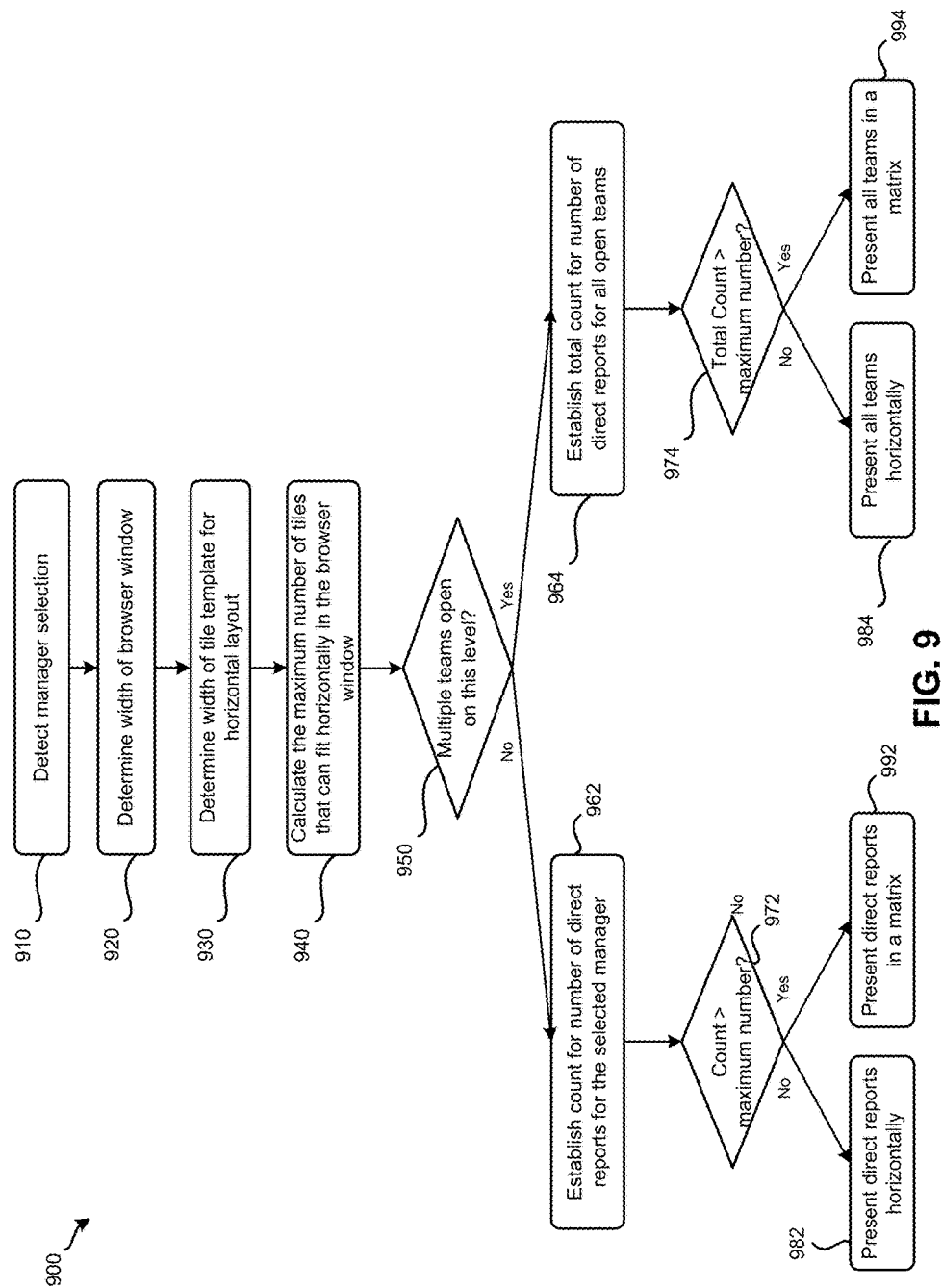
FIG. 9 illustrates a process flow for presenting an organizational chart according to one embodiment.

FIG. 9 illustrates a process flow for presenting an organizational chart according to one embodiment. Process 900 can be stored in computer readable medium and executed by a processor. In one embodiment, process 500 can be performed by a processor such as CPU 1001 of FIG. 10. Process 900 begins by detecting the selection of a manager from the organizational chart at 910. The selection of the manager can be detected from a touch screen interface or through a peripheral device. In one example, the organizational chart can be presented with a list of managers where selection of a manager causes the organizational chart to present the direct reports of the selected manager.

Once the manager has been selected, process 900 can continue by determining the width of the browser window at 920. The width of the browser window can be measured in pixels. Process 900 can then continue by determining the width of the tile template for horizontal layout at 930. The tile template is the template which is used to present direct reports of the manager in a horizontal layout. Exemplary tile templates are shown in FIGS. 7a, 7b, and 7c. Depending on the zoom level of the organizational chart, a different tile template can be used, thus leading to a different width. The width can be measured using the same unit of measurement that was used when determining the width of the browser. The width measurement can also take into account the spacing between tiles in the organizational chart. For example if a tile is normally 100 pixels, the width measurement can be set to 120 pixels to factor in a spacing of 20 pixels between neighboring tiles.

Process 900 can then continue by calculating the maximum number of tiles that can fit horizontally in the browser window at 940. This calculation can be performed by dividing the width of the browser by the width of the tile template. The whole number portion of the result can be set as the maximum number.

Once the maximum number of tiles has been calculated, process 900 can continue by determining whether multiple teams are open on this level at 950. If the selected manager is the only manager with an open team on this level, then process 900 establishes a count for the number of direct reports for the selected manager at 962. This can be performed by querying the organization's database to determine the number of direct reports of the selected manager. A determination is then made as to whether the count is greater than the maximum number at 972. If the count is not greater than the maximum number, then process 900 continues by presenting the direct reports horizontally at 982. Alternatively if the maximum number is greater than the maximum count, then the number of direct reports cannot be presented horizontally in the browser window. As a result, process 900 continues by presenting the direct reports in a matrix at 992. The dimension of the matrix can be determined based on the count, the browser window size, the available space in the browser window or a combination.

Alternatively if there are multiple teams open on this level at 950, then process 900 can continue by establishing a total count for the number of direct reports for the selected manager plus the number of direct reports in the other open teams at 964. At 974, process 900 continues by determining whether the total count is greater than the maximum number. If the total count is not greater than the maximum number (i.e., the browsing window is wide enough to display all direct reports for all open teams horizontally), then process 900 continues by presenting all the teams horizontally at 984. Alternatively if the total count is greater than the maximum number, then process 900 can present all teams in a matrix view at 994. Calculations can be performed for each open team to determine the matrix dimensions for each open team. As described above, the matrix dimensions can depend on various factors such as the number of direct reports in the team, the width of the browser window, the height of the browser window, the available space within the browser window, the total number of direct reports that belong to open teams in the current level, and the zoom level, to name a few.

Figure 10:
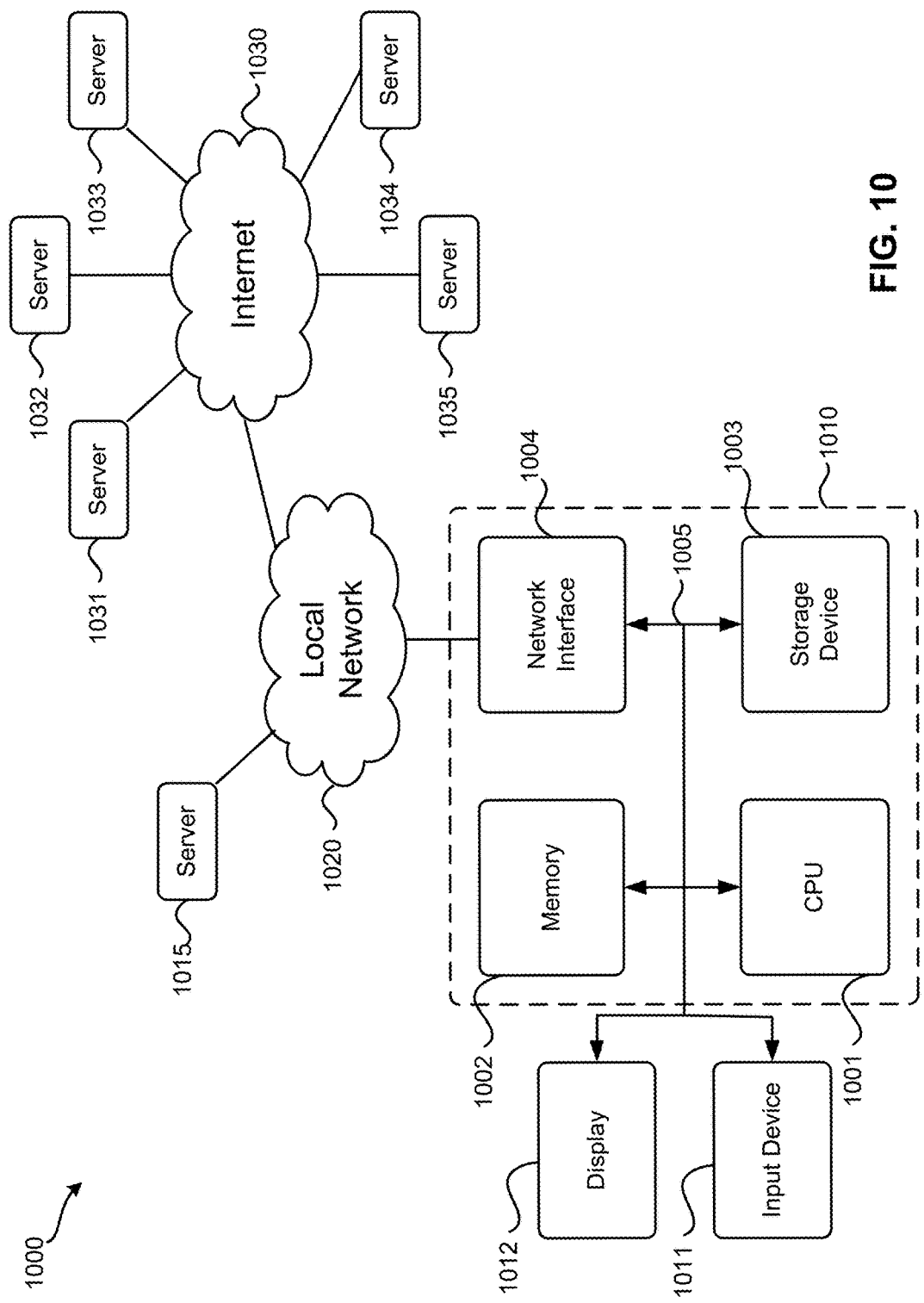
FIG. 10 illustrates an exemplary computer system according to one embodiment.

An exemplary computer system 900 is illustrated in FIG. 10. Computer system 1010 includes a bus 1005 or other communication mechanism for communicating information, and a processor 1001 coupled with bus 1005 for processing information. Computer system 1010 also includes memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    presenting, by a processor, an organizational chart within a window of a graphical user interface, the organizational chart including a plurality of nodes that each represent an employee within an organization as a tile within the window;
    detecting, by the processor, a first user input on the graphical user interface that is representative of selecting a first node from the plurality of nodes;
    querying, by the processor, a database storing hierarchical organization information to identify a first set of employees within the organization that are associated with the employee in the organization represented by the selected first node;
    determining a number of employees in the first set of employees;
    determining, by the processor, a matrix layout to be a vertical vector layout when the number of employees in the first set of employees is less than a predefined threshold in order to reduce horizontal scrolling to view the first set of employees;
    determining the matrix layout to be a matrix layout other than the vertical vector layout when the number of employees in the first set of employees is greater than or equal to the predefined threshold;
    generating, by the processor, a first matrix that represents the first set of employees, wherein the first matrix includes a set of tiles positioned according to the matrix layout, the set of tiles each being configured to represent an employee within the first set of employees;
    presenting, by the processor, the first matrix with the plurality of nodes of the organizational chart; and
    visually connecting, by the processor, the first matrix to the first node.

2. The computer-implemented method of claim 1, wherein the matrix layout is a vertical vector when the first set of employees is less than a predefined threshold of employees and is a multidimensional vector when the first set of employees is equal to or more than the predefined threshold of employees.

3. The computer-implemented method of claim 2, wherein determining the matrix layout comprises:
    determining, by the processor, a number of employees within the first set of employees; and
    selecting, by the processor, dimensions for the multidimensional vector based on the number of employees to reduce the occurrence of an empty tile in the matrix.

4. The computer-implemented method of claim 1, wherein determining the matrix layout comprises:
    identifying, by the processor, a plurality of potential matrix layouts based on a number of employees in the second set of employees; and
    selecting, by the processor, the first matrix layout from the potential matrix layouts based on available space within the window.

5. The computer-implemented method of claim 1, wherein the matrix layout is a first matrix layout, wherein the set of tiles is a first set of tiles, the method further comprising:
    detecting, by the processor, a second user input on the graphical user interface that is representative of resizing the window;
    determining, by the processor, that the set of tiles of the matrix overlaps with a boundary of the resized window;
    generating, by the processor, a second matrix comprising a second set of tiles positioned according to a second matrix layout that fits the second matrix within the boundary of the resized window; and
    updating, by the processor, the first matrix layout of the first matrix with the second matrix layout of the second matrix.

6. The computer-implemented method of claim 1 further comprising:
    determining, by the processor, that the first matrix and a second matrix violate a predefined spacing requirement, the second matrix being configured to represent a second set of employees and being visually connected to a second node from the plurality of nodes;
    horizontally shifting, by the processor, the first matrix and the second matrix until the first matrix and the second matrix satisfy the predefined spacing requirement; and
    horizontally shifting, by the processor, the plurality of nodes according to the horizontal shifting of the first matrix and the second matrix.

7. The computer-implemented method of claim 1 further comprising:
    determining, by the processor, that at least one tile in the plurality of tiles of the organizational chart extends outside the window or at least one tile in the set of tiles of the first matrix extends outside the window; and
    resizing, by the processor, the plurality of tiles of the organizational chart and the set of tiles of the first matrix that represent the first set of employees such that the plurality of nodes of the organizational chart and the plurality of nodes of the first matrix fit within the window.

8. The computer-implemented method of claim 1, wherein the plurality of nodes of the organizational chart are organized according to a hierarchy comprising a plurality of horizontal levels, wherein nodes in the plurality of nodes of the organizational chart representing employees at the same rank are presented in the same horizontal level of the hierarchy.

9. A non-transitory computer readable storage medium storing one or more programs, the one or more programs comprising instructions for:
    presenting an organizational chart within a window of a graphical user interface, the organizational chart including a plurality of nodes that each represent an employee within an organization as a tile within the window;
    detecting a first user input on the graphical user interface that is representative of selecting a first node from the plurality of nodes;
    querying a database storing hierarchical organization information to identify a first set of employees within the organization that are associated with the employee in the organization represented by the selected first node;

determining a number of employees in the first set of employees;

determining a matrix layout to be a vertical vector layout when the number of employees in the first set of employees is less than a predefined threshold in order to reduce horizontal scrolling to view the first set of employees;

determining the matrix layout to be a matrix layout other than the vertical vector layout when the number of employees in the first set of employees is greater than or equal to the predefined threshold;

generating a first matrix that represents the first set of employees, wherein the first matrix includes a set of tiles positioned according to the matrix layout, the set of tiles each being configured to represent an employee within the first set of employees;

presenting the first matrix with the plurality of nodes of the organizational chart; and visually connecting the first matrix to the first node.

10. The non-transitory computer readable storage medium of claim 9, wherein the matrix layout is a vertical vector when the first set of employees is less than a predefined threshold of employees and is a multidimensional vector when the first set of employees is equal to or more than the predefined threshold of employees.

11. The non-transitory computer readable storage medium of claim 10, wherein determining the matrix layout comprises:

determining a number of employees within the first set of employees; and selecting dimensions for the multidimensional vector based on the number of employees to reduce the occurrence of an empty tile in the matrix.

12. The non-transitory computer readable storage medium of claim 9, wherein determining the matrix layout comprises:

identifying a plurality of potential matrix layouts based on a number of employees in the second set of employees; and selecting the first matrix layout from the potential matrix layouts based on available space within the window.

13. The non-transitory computer readable storage medium of claim 9, wherein the matrix layout is a first matrix layout, wherein the set of tiles is a first set of tiles, wherein the one or more programs further comprises instructions for:

detecting a second user input on the graphical user interface that is representative of resizing the window;

determining that the set of tiles of the matrix overlaps with a boundary of the resized window;

generating a second matrix comprising a second set of tiles positioned according to a second matrix layout that fits the second matrix within the boundary of the resized window;

updating the first matrix layout of the first matrix with the second matrix layout of the second matrix.

14. The non-transitory computer readable storage medium of claim 9, wherein the one or more programs further comprises instructions for:

determining that the first matrix and a second matrix violate a predefined spacing requirement, the second matrix being configured to represent a second set of employees and being visually connected to a second node from the plurality of nodes;

horizontally shifting the first matrix and the second matrix until the first matrix and the second matrix satisfy the predefined spacing requirement; and horizontally shifting the plurality of nodes according to the horizontal shifting of the first matrix and the second matrix.

15. A computer implemented system, comprising:

one or more computer processors; and a non-transitory computer-readable storage medium comprising instructions, that when executed, control the one or more computer processors to be configured for:

presenting an organizational chart within a window of a graphical user interface, the organizational chart including a plurality of nodes that each represent an employee within an organization as a tile within the window;

detecting a first user input on the graphical user interface that is representative of selecting a first node from the plurality of nodes;

querying a database storing hierarchical organization information to identify a first set of employees within the organization that are associated with the employee in the organization represented by the selected first node;

determining a number of employees in the first set of employees;

determining a matrix layout to be a vertical vector layout when the number of employees in the first set of employees is less than a predefined threshold in order to reduce horizontal scrolling to view the first set of employees;

determining the matrix layout to be a matrix layout other than the vertical vector layout when the number of employees in the first set of employees is greater than or equal to the predefined threshold;

generating a first matrix that represents the first set of employees, wherein the first matrix includes a set of tiles positioned according to the matrix layout, the set of tiles each being configured to represent an employee within the first set of employees;

presenting the first matrix with the plurality of nodes of the organizational chart; and visually connecting the first matrix to the first node.

16. The computer implemented system of claim 15, wherein determining the matrix layout comprises:

identifying a plurality of potential matrix layouts based on a number of employees in the second set of employees; and selecting the first matrix layout from the potential matrix layouts based on available space within the window.

17. The computer implemented system of claim 15, wherein the matrix layout is a first matrix layout, wherein the set of tiles is a first set of tiles, wherein the instructions control the one or more computer processors to be further configured for:

detecting a second user input on the graphical user interface that is representative of resizing the window;

determining that the set of tiles of the matrix overlaps with a boundary of the resized window;

generating a second matrix comprising a second set of tiles positioned according to a second matrix layout that fits the second matrix within the boundary of the resized window; and updating the first matrix layout of the first matrix with the second matrix layout of the second matrix.

18. The computer implemented system of claim 15, wherein the instructions control the one or more computer processors to be further configured for:

determining that the first matrix and a second matrix violate a predefined spacing requirement, the second matrix being configured to represent a second set of employees and being visually connected to a second node from the plurality of nodes;

horizontally shifting the first matrix and the second matrix until the first matrix and the second matrix satisfy the predefined spacing requirement; and horizontally shifting the plurality of nodes according to the horizontal shifting of the first matrix and the second matrix.

19. The computer implemented system of claim 15, wherein the matrix layout is a vertical vector when the first set of employees is less than a predefined threshold of employees and is a multidimensional vector when the first set of employees is equal to or more than the predefined threshold of employees.

20. The computer implemented system of claim 19, wherein determining the matrix layout comprises:

determining a number of employees within the first set of employees; and selecting dimensions for the multidimensional vector based on the number of employees to reduce the occurrence of an empty tile in the matrix.

\* \* \* \* \*